W. F. LEGG & F. A. BUECHNER.
BATTER CUP OR BUCKET.
APPLICATION FILED DEC. 28, 1912.
1,101,199.   Patented June 23, 1914.
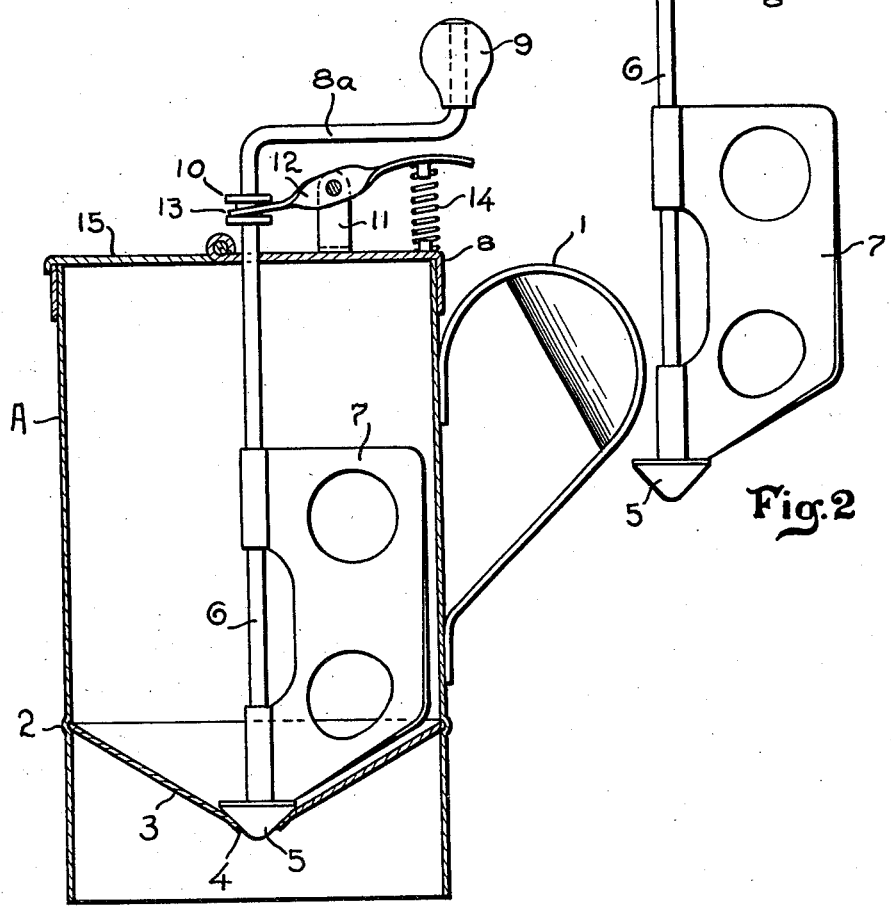

UNITED STATES PATENT OFFICE.

WALTER F. LEGG, OF DETROIT, AND FRANK A. BUECHNER, OF BATTLE CREEK, MICHIGAN; SAID BUECHNER ASSIGNOR TO SAID LEGG, FRANK L. ANDERSON, AND HERBERT W. MILLEN, OF DETROIT, MICHIGAN.

BATTER CUP OR BUCKET.

1,101,199.  Specification of Letters Patent.  Patented June 23, 1914.

Application filed December 28, 1912.  Serial No. 739,068.

*To all whom it may concern:*

Be it known that we, WALTER F. LEGG and FRANK A. BUECHNER, citizens of the United States, residing at Detroit, county of Wayne, and Battle Creek, county of Calhoun, State of Michigan, respectively, have invented a certain new and useful Improvement in Batter Cups or Buckets, and declare the following to be a full, clear, and exact description of the same, such as will enable others skilled in the art to which it pertains to make and use the same, reference being had to the accompanying drawings, which form a part of this specification.

This invention relates to batter cups or buckets for both mixing and controlling the outlet of the batter from the receptacle.

It is especially adapted for mixing and pouring pancake batter.

It has for its object a cup or bucket which is provided with a mixing dasher and also a valve that is carried on the same shaft so as to simplify the construction. The valve that controls the outlet passage also acts as a bearing for the shaft which carries the dasher.

In the drawings:—Figure 1, is a vertical section of the cup or bucket showing the dasher, valve and shaft in elevation. Fig. 2, is an elevation of the dasher, valve and parts that operate the same attached to the removable cover. Fig. 3, is a plain view of the lever that lifts the shaft.

The cup or bucket A is an ordinary cylindrical shell provided with a handle 1 by which it may be conveniently handled. The metal of the shell A is pressed outward at 2 forming a groove which holds the conical bottom 3, that is open at 4, which is the apex of a cone. Into this opening, whose border forms a valve seat, fits a conical valve 5 that is carried on a shaft 6, that also carries a dasher or stirrer 7. A cover 8 fits over the top of the bucket A and the shaft 6 passes through the center of this cover and terminates in a crank arm 8 that has a handle 9. The shaft 6, just before it bends to form the crank arm 8, is provided with a double collar 10. A bracket 11 fastened to the cover 8 supports a lever 12 which has a bifurcated end 13 that engages about the collar 10. This lever 12 is pressed at the end opposite the bifurcated end by the coil spring 14 so that it tends to force the shaft 6 downward and the valve 5 against its seat. This will ordinarily keep the valve upon its seat and the receptacle closed. The lid 15 is hinged to the cover 8 so that the constituents of the batter may be placed in the bucket without removing the entire cover 8, which slides on and off the shell A and which carries the crank arm and the lever which operate the dasher and valve respectively.

By lifting the lid 15, the flour and other necessary ingredients for pancake, cake batter or other mixtures used in cooking may be introduced into the bucket. The lid may then be closed and the dasher 7 revolved by turning the crank 9. The dasher revolves on an ample bearing which, in this case, is the valve 5 located upon its seat. When it is desired to let any of the batter out or to pour it as on a pancake griddle, all that is necessary to do is to press the free end of the lever 12 and this serves to lift the shaft 6 and lift the valve off from its seat, allowing the batter to run out of the opening in the bottom until the pressure on the lever 12 is relieved, whereupon the spring 14 automatically closes the valve 5 upon its seat.

From the above description, it is evident that our invention has points of superiority both on account of simplicity and cheapness of construction and that it is also convenient to use.

What we claim is:—

The combination of a receptacle having a conical bottom open at its apex, a vertically disposed shaft provided with a conical head at its lower end that acts as a valve for said opening in the conical bottom and is also rotatably mounted upon the walls surrounding said opening as bearings, a dasher fixed to said shaft, a member near the top of the receptacle for journaling the vertically disposed shaft thereat, a double collar near the upper end of said shaft, a crank terminating the upper end of the shaft, a lever pivoted near the upper end of the shaft and provided with a bifurcated end straddling said double collar and engaging in the groove formed thereby, a spring for forcing the bifurcated end of the collar down so as to keep the valve tightly upon its seat until the lever is actuated with the hand, substantially as described.

In testimony whereof, we sign this specification in the presence of two witnesses.

WALTER F. LEGG.
FRANK A. BUECHNER.

Witnesses:
H. A. ROWLES,
A. M. MUITY.